(12) United States Patent
Li

(10) Patent No.: US 12,291,194 B2
(45) Date of Patent: May 6, 2025

(54) BI-DIRECTIONAL AUTONOMOUS VEHICLE

(71) Applicant: Chian Chiu Li, Fremont, CA (US)

(72) Inventor: Chian Chiu Li, Fremont, CA (US)

(*) Notice: Subject to any disclaimer, the term of this patent is extended or adjusted under 35 U.S.C. 154(b) by 150 days.

(21) Appl. No.: 18/208,269

(22) Filed: Jun. 10, 2023

(65) Prior Publication Data
US 2023/0339458 A1    Oct. 26, 2023

Related U.S. Application Data

(63) Continuation-in-part of application No. 17/002,177, filed on Aug. 25, 2020, now abandoned.

(51) Int. Cl.
*B60W 30/06* (2006.01)
*G05D 1/00* (2006.01)

(52) U.S. Cl.
CPC ........... *B60W 30/06* (2013.01); *G05D 1/0016* (2013.01); *B60W 2540/21* (2020.02); *B60W 2540/223* (2020.02)

(58) Field of Classification Search
CPC ............. B60W 30/06; B60W 2540/21; B60W 2540/223; B60W 2040/0881; B60W 2420/403; B60W 2420/54; B60W 2540/225; B60W 2540/227; B60W 60/0013; B60W 40/08; G05D 1/0016; B62D 63/02
See application file for complete search history.

(56) References Cited

U.S. PATENT DOCUMENTS

| 10,457,179 B1 * | 10/2019 | Kentley-Klay | ........ B60N 2/879 |
| 2010/0300796 A1 | 12/2010 | Ryan et al. | |
| 2021/0380134 A1 | 12/2021 | Kanitz | |

FOREIGN PATENT DOCUMENTS

WO    WO-2011154681 A1 *  12/2011  ............. H01H 23/16

OTHER PUBLICATIONS

Transportation Research Board, Intelligent Transportation Systems 2013: Connected Vehicles and Cooperative Systems, vol. 2. Transportation Research Record: Journal of the Transportation Research Board, No. 2381 (Year: 2013).*

* cited by examiner

*Primary Examiner* — Elaine Gort
*Assistant Examiner* — Chanmin Park

(57) ABSTRACT

Systems and methods for a bi-directional autonomous vehicle. In one aspect, a vehicle's forward direction and front end are determined by a user's command, sitting orientation, records, or prearrangement. In another aspect, a vehicle's forward direction and front end are determined by a destination, road conditions, or parking lot conditions. Moreover, a vehicle's shape is adjustable according to front end selection.

20 Claims, 7 Drawing Sheets

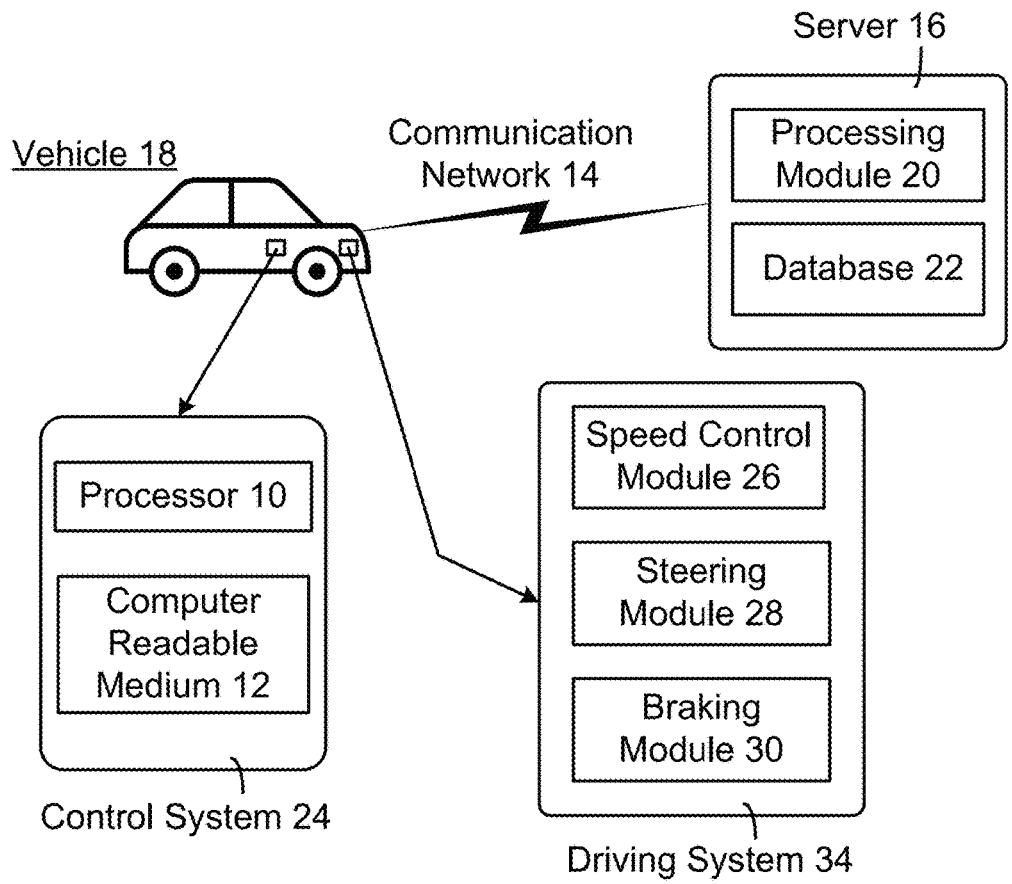
FIG. 1-A
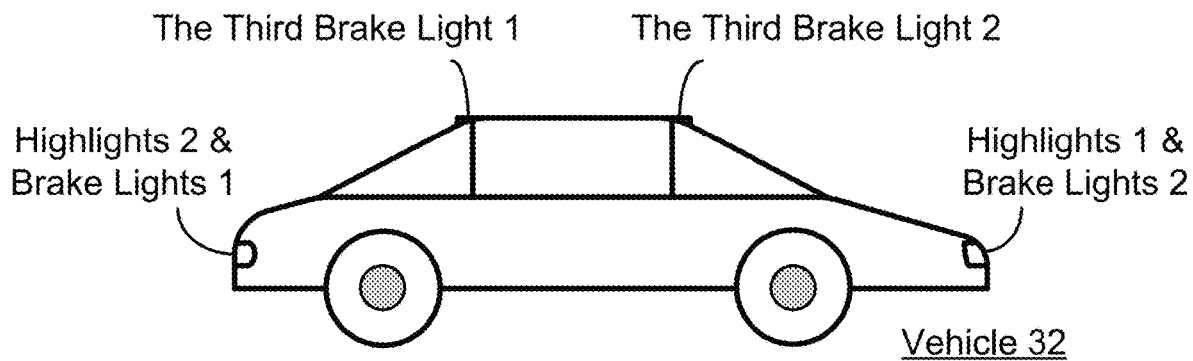
FIG. 1-B

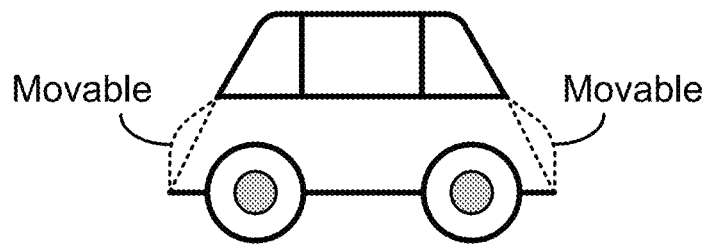
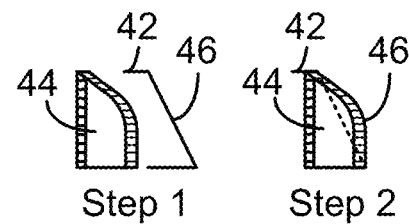
FIG. 2-A  FIG. 2-B
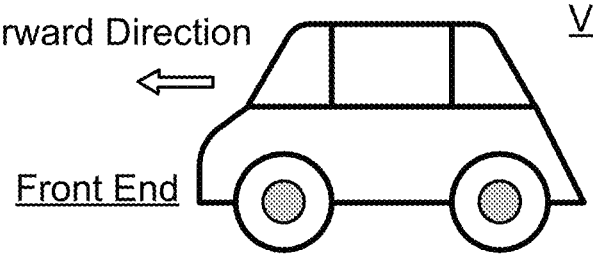
FIG. 2-C
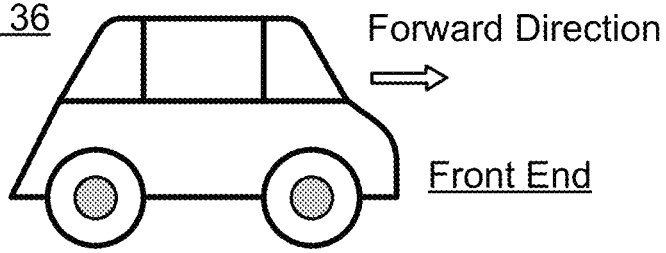
FIG. 2-D
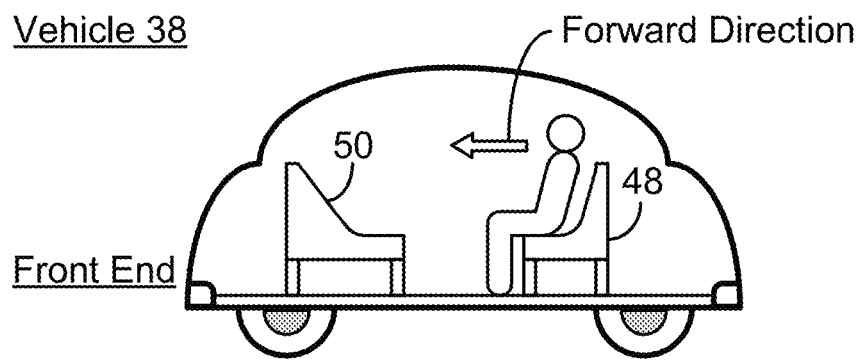
FIG. 3

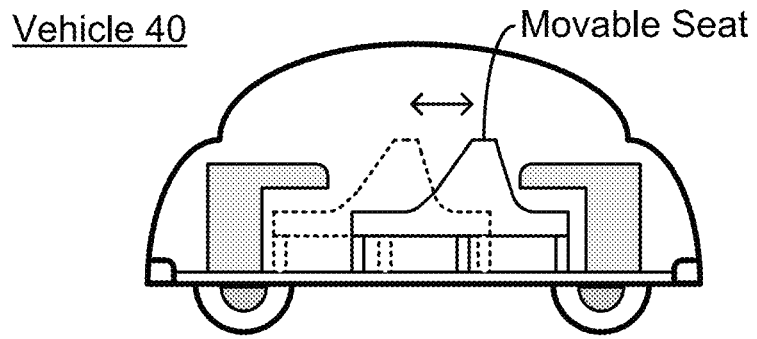
FIG. 4-A
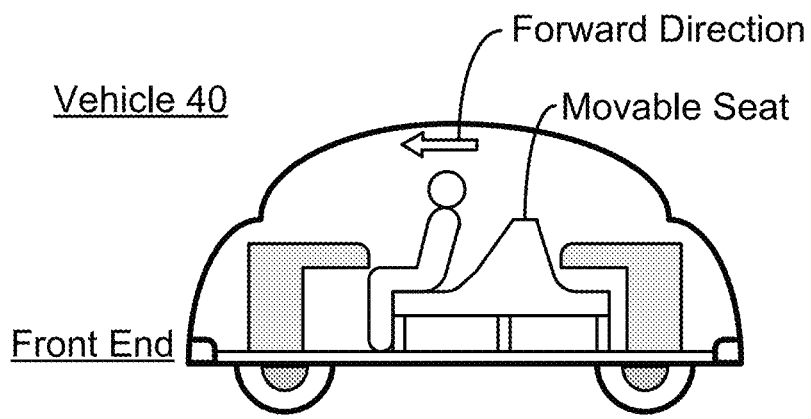
FIG. 4-B
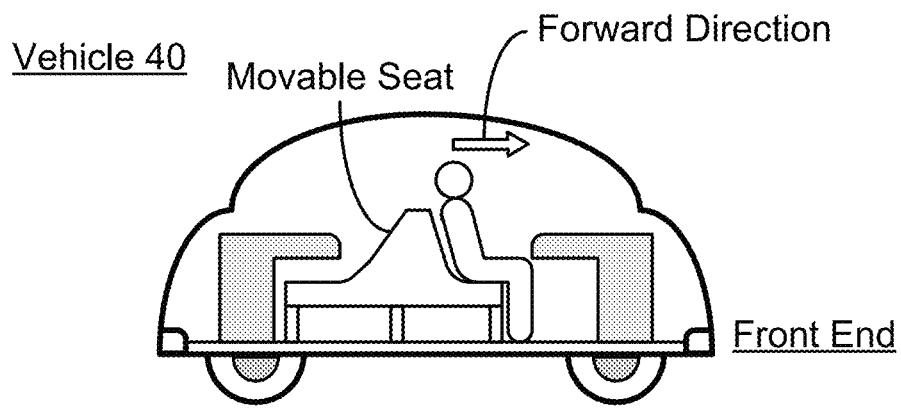
FIG. 4-C

BI-DIRECTIONAL AUTONOMOUS VEHICLE

CROSS REFERENCE TO RELATED APPLICATION

This is a continuation-in-part of U.S. patent application Ser. No. 17/002,177, filed Aug. 25, 2020, which is a continuation-in-part of U.S. patent application Ser. No. 15/813,133, filed Nov. 14, 2017, now U.S. Pat. No. 10,809,720.

BACKGROUND

Field of Invention

This invention relates to the field of autonomous vehicle, more particularly to selection of the forward direction and front end of a bi-directional autonomous vehicle.

Description of Prior Art

Autonomous vehicles represent a great advance in the transportation industry. Autonomous driving is expected to reduce traffic fatalities and crashes caused by driver errors, provide increased mobility for people who lack access to automobiles, reduce energy consumption and pollution, and cut costs associated with congestion. In general, an autonomous vehicle (also known as a driverless or self-driving vehicle) is a vehicle capable of sensing and navigating around the vehicle's surroundings and travelling autonomously to a destination without user input.

In driver-operated vehicles except buses and trams, seats are arranged facing one direction, the forward direction. In autonomous vehicles, however, seats may be arranged facing both forward and backward directions. An autonomous vehicle may be made bi-directional without dealing with transmission and steering difficulties which a conventional vehicle has to overcome. A bi-directional vehicle may use either end as its front and drive for a long distance in opposite directions, respectively. When a user takes a seat in a bi-directional vehicle, the user may not know which direction the vehicle would go along and may end up sitting there facing the backward direction. Then the user may want to change seat in a hassle, which may cause inconvenience and anxiety.

Therefore, there exists a need for matching a bi-directional vehicle's forward direction with a user's sitting orientation or a user's selection.

As used herein, the word "vehicle" may mean any form of motorized transportation. Examples of vehicles may include an automobile, a drone, a flying car, an aircraft, and a ship. For convenience of description, the term "Service Center" as used herein may indicate a center or remote facility as a business entity or a server which is operated at Service Center. The term "check in" as used herein may indicate a user logs in a system at a vehicle using info obtained from a reservation or using other suitable info. After a check-in process, the user may be allowed to interact with a vehicle further. The term "autonomous mode" as used herein may indicate a driverless driving state. When a vehicle is in autonomous mode, it navigates and travels by itself without the need of user input.

OBJECTS AND ADVANTAGES

Accordingly, several main objects and advantages of the present invention are:

a). to provide an improved system and method for a bi-directional autonomous vehicle;

b). to provide such a system and method which determine a forward direction and front end based on a user's command;

c). to provide such a system and method which determine a forward direction and front end based on a user's sitting orientation;

d). to provide such a system and method which determine a forward direction and front end based on a user's records or prearrangements;

e). to provide such a system and method which determine a forward direction and front end based on a destination, road conditions, and/or parking lot conditions; and f). to provide such a system and method which change a vehicle's shape to match a forward direction.

Further objects and advantages will become apparent from a consideration of the drawings and ensuing description.

SUMMARY

In accordance with the present invention, a bi-directional autonomous vehicle may select a proper forward direction and front end to improve a user's riding experience. The vehicle may take a user's command and choose a forward direction and front end based on the command. The vehicle may detect a user's sitting orientation and choose a forward direction and front end based on the sitting orientation. The vehicle may decide a forward direction and front end based on a user's records or prearrangements. The vehicle may also decide a forward direction and front end based on a destination, road conditions, or parking lot conditions. Furthermore, a vehicle's exterior shape may be adjusted when its front and rear ends are switched.

DRAWING FIGURES

FIGS. 1-A and 1-B are exemplary diagrams describing bi-directional autonomous vehicles respectively in accordance with the present invention.

FIGS. 2-A, 2-B, 2-C, and 2-D are exemplary diagrams depicting a bi-directional vehicle with an adjustable shape in accordance with the present invention.

FIG. 3 is an exemplary illustration which describes a method to determine a vehicle's forward direction and front end based on a user's sitting orientation in accordance with the present invention.

FIGS. 4-A, 4-B, and 4-C are exemplary diagrams illustrating a vehicle having a movable seat in accordance with the present invention.

REFERENCE NUMERALS IN DRAWINGS

Figure 5:
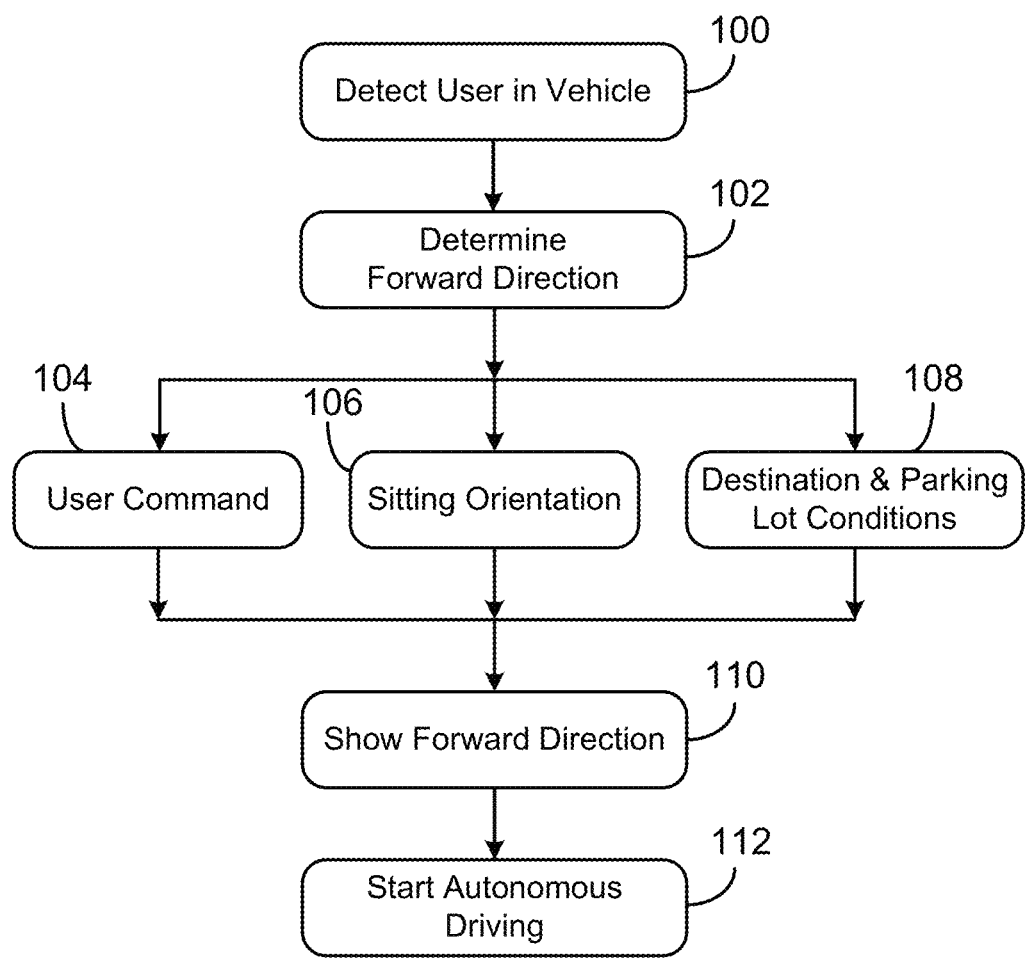
FIG. 5 is an exemplary flow diagram describing methods to determine a vehicle's forward direction and front end in accordance with the present invention.

| 10 | Processor | 12 | Computer Readable Medium |
|---|---|---|---|
| 14 | Communication Network | 16 | Server |
| 18 | Bi-Directional Vehicle | 20 | Processing Module |
| 22 | Database | 24 | Control System |
| 26 | Speed Control Module | 28 | Steering Module |
| 30 | Braking Module | 32 | Bi-Directional Vehicle |
| 34 | Driving System | 36 | Bi-Directional Vehicle |
| 38 | Bi-Directional Vehicle | 40 | Bi-Directional Vehicle |
| 42 | Object | 44 | Object |
| 46 | Flexible Sheet | 48 | Seat |
| 50 | Seat | | |

100-168 are exemplary steps.

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

FIG. 1-A is an exemplary block diagram that illustrates some embodiments according to the present invention. A vehicle 18 and a server 16 are connected via a wireless communication network 14. Assume that vehicle 18 is a bi-directional autonomous automobile for the purpose of illustrating methods and systems in descriptions below. Vehicle 18 may include a vehicle control system 24 and a driving system 34 responsible for vehicle navigation and driving, respectively. System 24 may include a processor 10 and computer readable medium 12. Processor 10 may include one or more processor chips or systems. Medium 12 may be the main part of a vehicle storage system and may include a memory hierarchy built by one or more memory chips or storage components like RAM, ROM, FLASH, or other suitable storage modules. Processor 10 may execute algorithms, programs, or sets of executable instructions stored in medium 12 to perform various functions and tasks, e.g., receiving and processing data collected from sensors, retrieving map data from medium 12, sending driving signals to system 34, executing other applications, etc. System 24 may also include input, output, and communication components, which may be individual modules or integrated with processor 10.

In addition, system 24 may have a display (not shown) and a graphical user interface (GUI). The display may have a liquid crystal display (LCD) screen or light emitting diode (LED) screen and may be arranged sensitive to touches, i.e., sensitive to haptic and/or tactile contact with a user. The display may serve as the main display of system 24 and the interface may be used to show vehicle status, driving conditions, current driving route, and certain options. A user may use the interface to search and retrieve information, view surrounding area maps, enter input or instructions, interact with system 24, and so on.

Driving system 34 may include modules 26, 28, and 30 for implementing driving maneuvers which are determined by system 24. Speed control module 26 is configured to regulate the driving force or speed of vehicle 18. For a gasoline or diesel powered vehicle with an internal combustion engine, module 26 contains a throttling system which controls the speed of the engine which in turn determines the speed of the vehicle via a transmission system. For an electric vehicle, module 26 may contain a driver system to control the speed of an electric motor. The motor speed determines the vehicle speed. Steering module 28 is arranged to control the steering torque which then adjusts the heading of the vehicle. Braking module 30 is designed to use a hydraulic brake system to decelerate the vehicle.

In practice, an electric autonomous vehicle may be favored for bi-directional driving. First, an electric motor can rotate in opposite directions and needs just one gear. An internal combustion engine, however, only rotates in one direction, and thus needs both the forward and reverse gears. For instance, a conventional gasoline powered vehicle may have multiple forward gears and a single reverse gear. The single reverse gear limits the vehicle to low backward speeds. Second, a bi-directional automobile may be steered using front wheels when driving along one direction and using rear wheels when driving along the opposite direction. It may become an issue since many users may find it hard to control when rear wheels are used to maneuver a vehicle. The control difficulties may be resolved by fine-tuned programs in autonomous mode. Therefore, an electric autonomous vehicle may be preferred when bi-directional driving is implemented.

Many autonomous vehicles are likely owned, serviced, and managed by business entities. Assume that vehicle 18 is administered by Service Center and server 16 is installed at Service Center. The word "server" may indicate a system or systems which may have similar functions and capacities as one or more servers. Main components of a server may include one or more processors, which control and process data and information by executing algorithms, software, logic, code, or carrying out any other suitable functions. Server 16 may be divided exemplarily into two blocks, represented by a processing module 20 and a database 22. Processing module 20 may include processing and communication functions. Database 22 may store vehicle service records and information, map data and geographic info of certain areas, user account information, user transaction records, user activity records, etc. The database may include a cluster of aforementioned and other memory chips and/or storage modules.

Vehicle 18 may include multiple sensors (not shown) to detect the external environment that surrounds the vehicle and users inside the vehicle. The sensors may include multiple cameras, a radar system, a light detection and ranging (LIDAR) system, a GPS device, a speed sensor, an accelerometer, an electronic compass, a suspension sensor, etc. Some cameras may be located on or exposed to the exterior of the vehicle. These cameras may be used to take images and videos of the surroundings to detect and recognize road signs, road marks, pedestrians, obstacles, other vehicles, buildings, land marks, etc. Some other cameras may be arranged inside the vehicle to sense a user or occupant, like whether a user has settled down after getting in the vehicle. The radar and LIDAR systems may detect the surroundings and create a three-dimensional image which is advantageous over two-dimensional images generated by cameras. Three-dimensional images are especially useful to sense and recognize pedestrians and other vehicles. The GPS device provides the present location of vehicle 18. GPS data may be combined with info acquired by cameras, radar, and LIDAR to obtain a precise location of the vehicle.

Furthermore, vehicle 18 may have a voice recognition system or mechanism to receive and interpret a user's voice command or vocal input. The voice recognition system or mechanism may employ multiple microphones which may be configured at several places inside the vehicle. Arrangement of the microphones may be optimized for efficient collection of voice input from uses inside the vehicle. Vehicle 18 may also have a gesture detection sensor or mechanism to sense a user's gesture instructions. In addition, vehicle 18 may contain a facial recognition system or facial recognition mechanism which may recognize the identity or certain features of a user, such as whether a person is a small child. Both the gesture and the facial recognition methods rely on pictures and/or videos captured by cameras installed inside the vehicle. It is noted that the voice, gesture, and facial recognition technologies are all mature nowadays.

FIG. 1-B shows an exemplary bi-directional vehicle 32 according to the present invention. Vehicle 32 may look like a conventional unidirectional vehicle, which has a conventional front end on the right-hand side and a conventional rear end on the left-hand side. Since the vehicle is bi-directional, it may be driven in opposite directions respectively, i.e., to the right or the left in the figure. Accordingly, vehicle 32 may have two sets of lights prepared for the two directions. For instance, when going to the right, highlights 1, brake lights 1, and a third brake light 1 are activated. The third brake light is also referred to as the center high mount stop lamp. When vehicle 32 drives to the left direction, the left side become its front end and highlights 2, brake lights 2, and a third brake light 2 are in use. Not shown in FIG. 1-B are additional sensors for observing surroundings comparing to a unidirectional vehicle. The additional sensors may be required to assist the reverse driving. Furthermore, an improved radar and LIDAR system may be installed to accommodate the new needs when heading backwards.

FIGS. 2-A, 2-B, 2-C, and 2-D are exemplary diagrams showing a bi-directional vehicle 36 according to the present invention. For a unidirectional vehicle, its front side looks like a front end and its back looks like a rear end. Since a bi-directional vehicle moves in either direction, there are two options if the exterior shape is fixed: A vehicle may have a symmetrical shape or asymmetrical shape along a front-rear direction. In the former case, a vehicle's front and rear ends may look similar or identical. In the latter case, a vehicle may appear in forward motion along one direction, and appear in backward motion along the other direction. If a bi-directional vehicle always appears to be driven in a forward direction, the shape of the vehicle would be changeable or switchable, that is, the vehicle's exterior shape may be changed to fit a driving direction. For instance, vehicle 36 has adjustable parts that enable an adjustable shape at both ends. As used herein, a forward direction may also be referred to as a forward driving direction of a vehicle.

As shown in FIG. 2-A, the adjustable parts are depicted by dotted lines. The surface may be switched between a curved surface and a flat surface. It is well known that certain object may have a changeable or deformable shape. Many mechanisms may exist. FIG. 2-B describes a schematic method to make the change. Assume an object 42 has a flexible sheet 46 which forms a flexible surface. An object 44 has a rigid curved surface which bulges outwards. At step 1, objects 42 and 44 are not in contact. Sheet 46 remains flat. At step 2, object 44 is pushed inside object 42 and the rigid curved surface presses against sheet 46 in an outward direction. Sheet 46 becomes curved and bulges outwards. The dotted line reflects the original position of sheet 46. The schematic method described at steps 1 and 2 may be used to make a surface switch between a flat and a curved state. When the method is applied at vehicle 36, the vehicle may have an adjustable end, which may be changed from a curved shape to a flat shape, or vice versa.

In FIG. 2-C, assume vehicle 36 drives towards the left direction, which makes the left direction the forward direction. Hence, the left side of vehicle 36 becomes the front end. At a designing stage of vehicle 36, it may be decided that the front end features a curved surface, while the rear end has a flat surface. A vehicle manufacturer or Service Center may determine which shape represents the front end and which shape is for the rear end. On the other hand, a user may make selections too. For instance, a user may choose a shape for the front and another for the back during a check-in process or in the middle of a journey if it is allowed. After it gets information that the left is the front end, a control system of the vehicle may send a signal to an actuator which generates a bulged surface at the left side. Meanwhile, another actuator may create a flat surface at the right side. After the change, vehicle 36 looks like driving to the left direction in a forward motion.

When vehicle 36 drives to the right direction at the next moment, the control system may adjust both ends' exterior shape. Results after the adjustment are shown in FIG. 2-D. The right side appears bulged and the left side becomes flat. Thus, whether vehicle 36 drives to the left or to the right, it appears in a forward motion all the time. Therefore, a bi-directional vehicle may change shape according to the needs and achieve improved user experience.

Like a conventional automobile, an autonomous vehicle designed for personal use may have two rows of seats due to a small interior space. Since there is no driver and no steering wheel, the front seats may face backward and the two rows may be in a face-to-face configuration, as shown exemplarily in FIG. 3. In the figure, an exemplary bi-directional vehicle 38 takes a symmetric shape along a front-rear direction. When it moves, its front is considered as the front end. For instance, if the vehicle drives to the left direction, the left side may be viewed as the front end and the right side as the rear end. If the vehicle moves to the right, the right side becomes the front end. The vehicle may also have an asymmetric shape, as the shape factor doesn't affect descriptions below.

Inside an autonomous vehicle, face-to-face seats may be identical. On the other hand, the seats may also be designed different to provide multiple options to a user. The seats may have different styles, structures, finish, or functions. For instance, both velvet and leather seats may be arranged in a vehicle. Some seats may have massaging functions and some may provide virtual reality (VR) or augmented reality (AR) goggles. Whether the seats are identical or not, a user may have a preference and may take a seat of choice after getting in a vehicle. For instance in FIG. 3, there are seats 48 and 50 inside vehicle 38 in an exemplary illustration. Seat 48 may look like a regular car seat, while seat 50 may resemble a tilted recliner. Assume that a user takes seat 48 and sits there. Sensors inside vehicle 38 may keep monitoring the user. Measurement results may be sent to the vehicle's control system and used to ascertain whether the user has settled down.

Assume the destination info is known. After the control system determines via an algorithm that the user has settled down on seat 48, it may decide which direction it should drive along. As many users may favor facing toward the driving direction, the control system may be configured to decide the left direction should be the forward direction. So the left side becomes the front end and the right side becomes the rear end. In summary, a bi-directional vehicle may determine which direction should be the forward direction based upon a user's sitting orientation. When measurement data indicates a user faces along a direction, the direction may be chosen as the forward direction. Thus a user may take any seat in a bi-directional vehicle and always face the front end or the forward direction.

FIGS. 4-A, 4-B, and 4-C show an exemplary bi-directional vehicle 40 with a movable seat. Vehicle 40 may have a symmetric shape as in the figures or an asymmetric shape. As shown in FIG. 4-A, a movable seat is configured inside the vehicle. The solid lines and dotted lines represent the seat at two places. The seat has two sides facing opposite directions. The two sides may have the same style, structure, finish, and functions. Optionally, the two sides may have different styles, structures, finish, or functions. Back-to-back seats may be desirable when it is hard to accommodate a face-to-face scenario in a limited vehicle space.

In FIG. 4-B, a user moves the seat to the right and sits on the left side facing the left direction. In FIG. 4-C, the user moves the seat to the left and settles down on the right side facing the right direction. A control system of the vehicle may monitor the user continuously after the user gets inside. Once it is determined that the user chooses a place to sit, a direction the user faces is finalized. Then the control system may choose the direction, which the user faces, as the forward driving direction and the vehicle end, which the user faces, becomes the front end.

Besides a user's sitting orientation, a bi-directional vehicle's forward direction may also be determined by other factors. FIG. 5 shows an exemplary flow diagram which describes an embodiment related to selection of the forward direction and front end according to the present invention. Assume a user enters a bi-directional vehicle at step 100, which is detected by the vehicle's control system. Next the control system starts monitoring the user using sensors such as cameras and microphones installed at the vehicle. At step 102, the user may check in at the vehicle system and the control system is arranged to decide which direction should be the forward direction for the upcoming journey. There are several methods.

At step 104, the user may say a word or sentence as a voice command with or without a gesture. The user may also make gestures without saying anything. For instance, the user may utter "Go that way" and then use hand and fingers to point to a direction. The user may utter "Go forward" or "Go ahead" too, meaning to go along a direction the user faces. The user may also gesture without saying a word, like using a finger to point at a direction. The user's voice input may be sensed by a microphone and interpreted by a voice recognition system, a voice recognition mechanism, or a voice recognition algorithm. The user's gesture may be recorded as pictures and videos by one or more cameras and analyzed by a gesture recognition system or a gesture recognition mechanism. The interpreted voice and gesture messages may be sent to the control system. The control system may analyze the messages to identify a direction which the user selects. Then that direction is chosen as the forward direction and the front side of the vehicle along the selected forward direction becomes the front end. Alternatively, the user may also say "Front", "Forward", or "Front end" while pointing to one side of the vehicle using a finger or hand.

At step 106, a sitting orientation of the user is employed to decide the forward direction and front end. As aforementioned, many users may prefer facing a forward direction. Thus if it is detected that a user or multiple users all face one direction after taking a seat in a vehicle, the direction may be chosen as the forward direction. In some cases, a seat that a user takes and sits on determines the sitting orientation of the user. In such cases, the control system may detect which seat is taken by a user, and then determine the forward direction and front end by the seat which the user chooses and sits on.

It is noted that a user may select one end as the front end regardless of road or parking lot conditions. For instance, assume a vehicle is parked with one end against a wall. A user may still choose the end as front end. Then the vehicle may drive out of the parking spot first and then change driving direction to make the selected end as the front end. As used herein, a parking spot may also be referred as a parking space.

When user instructions are not detected and there are users sitting face to face or facing opposite directions, the control system may determine a forward direction based upon a destination and parking lot conditions as shown at step 108. Assume the control system obtains information of the destination from Service Center, including the geographic location of the destination. The term "parking lot conditions" as used herein may indicate a layout or map of a parking lot, locations of the parking lot exits, locations and orientation of the parking spots, and/or restrictions (e.g., curb or parking block positions) of each parking spot. Parking lot conditions may also be referred to as parking spot conditions. When a vehicle is parked at a parking lot or by the roadside of a two-way street and can drive along both directions, if the destination is located in the left direction, the left direction may be selected as the forward direction. If the destination is located in the right direction, the right direction may be selected as the forward direction. If the vehicle is parked at a one-way street, the allowable driving direction may be chosen as the forward direction.

When a vehicle is at a parking spot with one end facing a barrier (e.g., a parking block), the side facing the barrier may be selected as the rear end and the other side as the front end, which simplifies driving maneuvers and saves time. In such cases, a vehicle may drive to a parking spot, stop for some time, and then switch the front end, i.e., changing the rear end into the front end before leaving the parking spot. In some cases, the forward direction and front end may be determined only by a destination, road conditions, or parking lot conditions. In such cases, assume a user's command is not detected or implemented, and the user's sitting orientation is not sensed or not used as illustrated above.

After a forward direction is determined, the control system may display a sign or indicator to show a user at step 110. The sign or indicator, such as a lighted arrow, may indicate which direction is the forward direction and assure the user before the vehicle moves. At step 112, the control system starts navigating the vehicle and begins a journey in autonomous mode.

Figure 6:
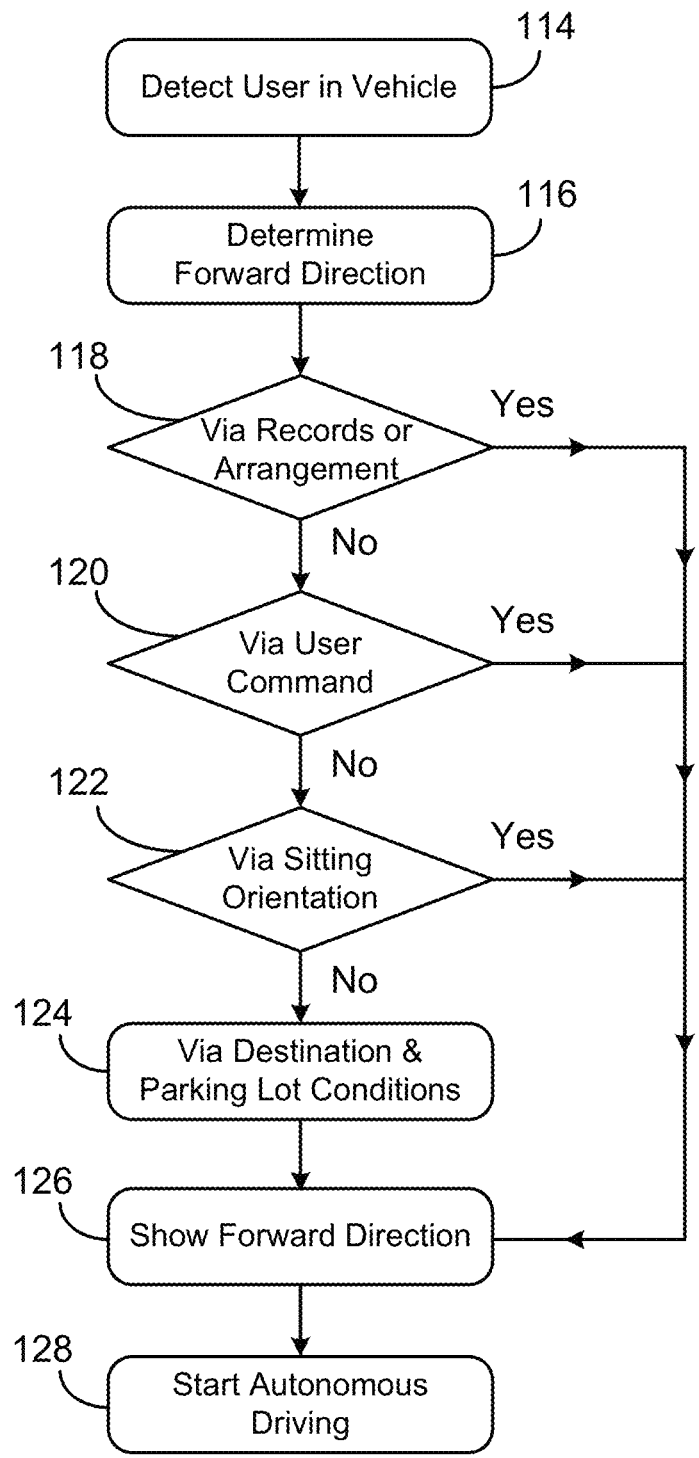
FIG. 6 is an exemplary flow diagram illustrating a process to decide a vehicle's forward direction and front end in accordance with the present invention.

FIG. 6 shows another exemplary flow diagram which describes methods to determine a forward direction according to the present invention. At step 114, a user enters a bi-directional vehicle and then checks in at the vehicle system. Meanwhile, the vehicle's control system runs a monitoring algorithm to monitor any input made by the user, and sends the user's identity info to Service Center. Then, Service Center retrieves user information of the user, and transmits it to the control system. The user information may include past riding preferences and options and prearrangements submitted in a reservation process. The control system may get the destination information from the input entered by the user or from Service Center if the user has a reservation. In addition, the control system may use sensors installed at the vehicle, e.g., an electronic compass and GPS device, to acquire the orientation and position data of the vehicle.

At step 116, the control system may decide which direction should be the forward direction and which side of the vehicle should be the front end for an upcoming journey. The control system may execute a certain algorithm to decide a forward direction and front end based on the user information at step 118. For instance, a user's records may show that the user preferred one end as the front end or the user has selected a seat in a reservation and prefers facing a forward direction. Thus the control system may utilize past records or reservation information received from Service Center to determine the forward direction and front end at step 118. After that, the process proceeds with step 126.

Assume the control system can't decide which direction should be the forward direction based on information obtained from Service Center. At step 120, the system may detect whether the user gives any input. The system may monitor the user and collect any voice or gesture command after it is generated. After sensors at the vehicle detect a voice or gesture command from a user, the control system may run an analyzing algorithm to select a forward direction and front end based on the voice or gesture command. Then the process may proceed with step 126. It is noted that a user's command such as voice or gesture command may overwrite a decision made at any step (e.g., step 118). For instance, assume a user preselected a side as the front end during reservation. If the user points to the other side and says "Front", the control system may follow instructions made on site by the user, discard the prearrangement, and use the other side as the front end.

If the user doesn't give any instructions, the control system may run an orientation algorithm to determine the forward direction and front end based on the user's sitting orientation at step 122. As discussed above, since many users prefer facing a forward direction, the control system may detect which direction the user faces after taking a seat and then make that direction as the forward direction. Next the process may proceed with step 126.

If the control system can't decide the forward direction and front end at step 122, which may happen when there are multiple users in a vehicle and the users take face-to-face seats, the system may utilize the destination info, parking lot conditions, and/or road conditions to do it at step 124. Based on the location of a destination, the location of the vehicle, and the orientation of the vehicle, the control may calculate to determine if the vehicle has one end facing the location of the destination. If one end faces the destination, the end may be chosen as the front end. If a vehicle is parked at a parking space with one end facing a curb, the other end may be selected as the front end, which enables the vehicle to head for a destination without stopping to change the front end. It makes a journey smoother and more efficient. In some cases, the control system may obtain the layout and other information of a parking lot from Service Center or by measurements using sensors of the vehicle. If one end of the vehicle faces an exit of the parking lot, this end may be selected as the front end. Optionally, if one end of the vehicle faces an exit of a parking lot and a route to a destination passes through the exit, this end may be selected as the front end.

At step 126, one or more signs showing the selected forward direction may be displayed inside the vehicle. The signs are indicators presented for users. One or more signs may also be displayed on the exterior of the vehicle to show its driving direction to pedestrians around it and users in other vehicles. In some embodiments, the signs may include a LED system which may remain invisible and become a conspicuous arrow or moving arrows only after being lighted. Finally at step 128, the control system may execute a driving algorithm to drive the vehicle autonomously. Optionally, in some cases, steps 118-124 may be performed individually. For example, step 124 may be performed without doing one or more other steps first. In these cases, the vehicle's front end and forward direction may be determined just by, e.g., destination information and/or parking lot conditions.

Figure 7:
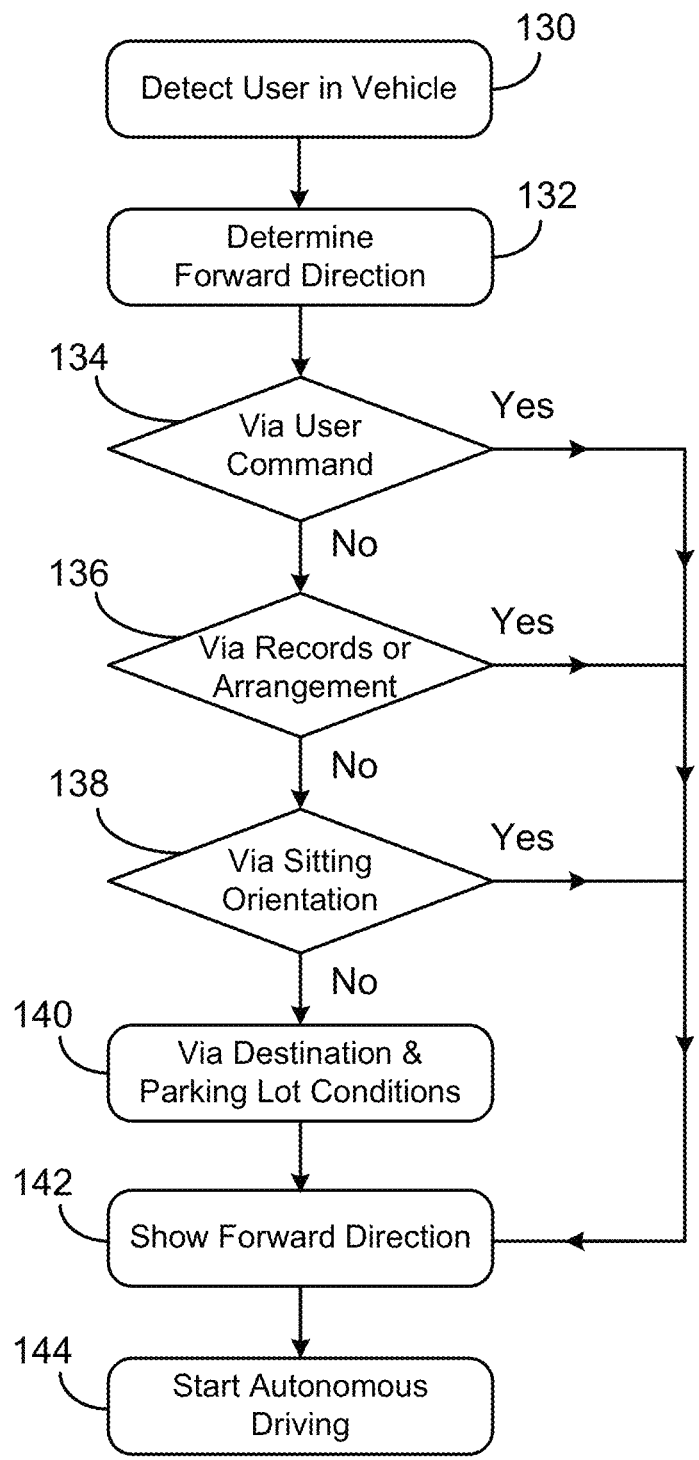
FIG. 7 is an exemplary flow diagram illustrating a process to decide a vehicle's forward direction and front end in accordance with the present invention.

FIG. 7 shows yet another exemplary flow diagram which describes methods to determine a forward direction according to the present invention. At step 130, a vehicle's control system detects that one or more users enter a bi-directional vehicle. Next, a check-in process is performed by a user and the control system receives a destination from the user. The vehicle's control system runs a monitoring algorithm or program to detect how many users get in the vehicle and monitor the one or more users. The monitoring results may be used to decide which direction should be the forward direction and which side of the vehicle should be the front end for a journey at step 132. One or more of the following steps may be taken to make the decision. In some embodiments, one or more cameras and one or more microphones may be used in the monitoring process. Alternatively, cameras and microphones may be combined with a radar system in the monitoring process. The check-in information is communicated to Service Center by the control system. After receiving the check-in information, Service Center retrieves related user information and preference information and then transmits the information to the control system. The user information may include past riding preferences and options of the user who performs the check-in process. The preference information may include prearrangements submitted in a reservation.

The control system may monitor whether any command is issued after the one or more users enter the vehicle via the monitoring algorithm or program at step 134 using the one or more cameras, the one or more microphones, and/or the radar system. For example, the control system may collect any voice and gesture input after it is received, and analyze the input to determine whether it contains a command. If the input contains a command in regard to selection of forward direction and front end, the control system determines a forward direction and front end based on the input or command. Methods described above may be used to make the selection. When there is only one user inside the vehicle, the user is monitored and the user's command is followed by the control system. When there are multiple users inside the vehicle, all users are monitored and a command issued by anyone of the users is followed by the control system. After a command about the forward direction is received and the forward direction and front end are selected, the process proceeds with step 142.

If user commands are not received in regard to front end selection within a given time after the one or more users get in the vehicle, the control system may execute a certain algorithm to decide a forward direction and front end based on the user information and preference information at step 136. The given time may be determined by Service Center and may be around, e.g., five to ten seconds. The user information may indicate that a user often selects a specific end of the vehicle as the front end, or the user often sits facing the front end. The preference information may include an arrangement about choosing one end as the front end that was submitted in a reservation, such as selecting a specific end as the front end or a direction which the user faces as the forward direction. After the forward direction and front end are selected, the process proceeds with step 142.

If a forward direction cannot be decided at steps 134 and 136, i.e., user instructions are not received and no decision can be made based on the user information and preference information, the control system may run an orientation algorithm to determine the forward direction and front end based on the sitting orientation at step 138. The control system may monitor the one or more users for the given time after the one or more users enter the vehicle. If no user command is received during the given time, it may be considered that no user command is obtained. As described above, the one or more users may still issue a command to determine or change a forward direction after the given time.

Before the control system determines the forward direction and front end based on the sitting orientation, the control system detects which direction a user faces after taking a seat and then makes that direction as the forward direction. When there are multiple users in the vehicle, an algorithm may be run to detect how many users face one direction and how many users face the other direction. The control system may select a direction which more users face as the forward direction in some cases. For example, if three users face one direction, while two users face the opposite direction, the direction which the three users face may be selected as the forward direction. Next the process proceeds with step 142. When a number of users face one direction and the same number of users face opposite directions, the sitting orientation method alone cannot be used to determine a forward direction.

If the control system can't decide the forward direction and front end at steps 134, 136, and 138, the control system may utilize destination information, parking lot conditions, and/or road conditions to do it at step 140. For instance, if the vehicle has one end facing the destination or one end facing an allowable driving direction of a one-way street, the end may be chosen as the front end, as doing so saves time. Optionally, if the vehicle is parked at a parking spot of a parking lot with one end facing a curb, the other end that faces a road, an aisle, or a driveway may be selected as the front end. The aisle may be an access aisle of the parking lot. Optionally, if the vehicle is parked at a parking lot with one end facing an exit of the parking lot, the end that faces the exit may be selected as the front end. Assume a parking lot has multiple exits including a first exit and a route to a destination passes through the first exit. If the vehicle is parked at the parking lot with one end facing the first exit, and the vehicle can move in opposite directions, the end that faces the first exit may be selected as the front end in some cases.

Next at step 142, one or more signs, e.g., conspicuous arrows or other indicators showing the selected forward direction, may be displayed inside the vehicle. The forward direction is shown so that a user may check and confirm it. The signs also assure the user about how the vehicle will be driven. If the user agrees with the front end selection, the user does not need to do anything. If the user wants the other direction as the forward direction, the user may issue a voice and/or gesture command to change it. In some embodiments, when the one or more signs are shown, a touch sensitive display of the control system may provide an option for the user to change the front end selection. For example, the display may show two interactive message items, such as "Confirm Front End Selection" and "Change Front End Selection". The user may tap the former item to confirm the front end selection or tap the latter item to change the front end. The user may also utter a verbal command to change the front end selection. The control system may keep monitoring the user to receive and implement user commands. Then at step 144, the control system executes a driving algorithm or driving program to drive the vehicle to the destination autonomously.

Optionally, steps 134-140 may be arranged in a different order and in any combination with the same or fewer steps. In some aspects, any one of the steps may be performed alone. For example, steps 134-138 may be removed and not executed, which makes step 140 the only step to determine the front end. In some other aspects, some of the steps 134-140 may be selected and performed. For example, steps 134-136 may be removed and not executed, while steps 138 and 140 may be implemented. In such cases, the control system may execute step 138 by ascertaining the sitting orientation of the user. If the control system cannot determine the front end via step 138, it implements step 140 to do it.

Figure 8:
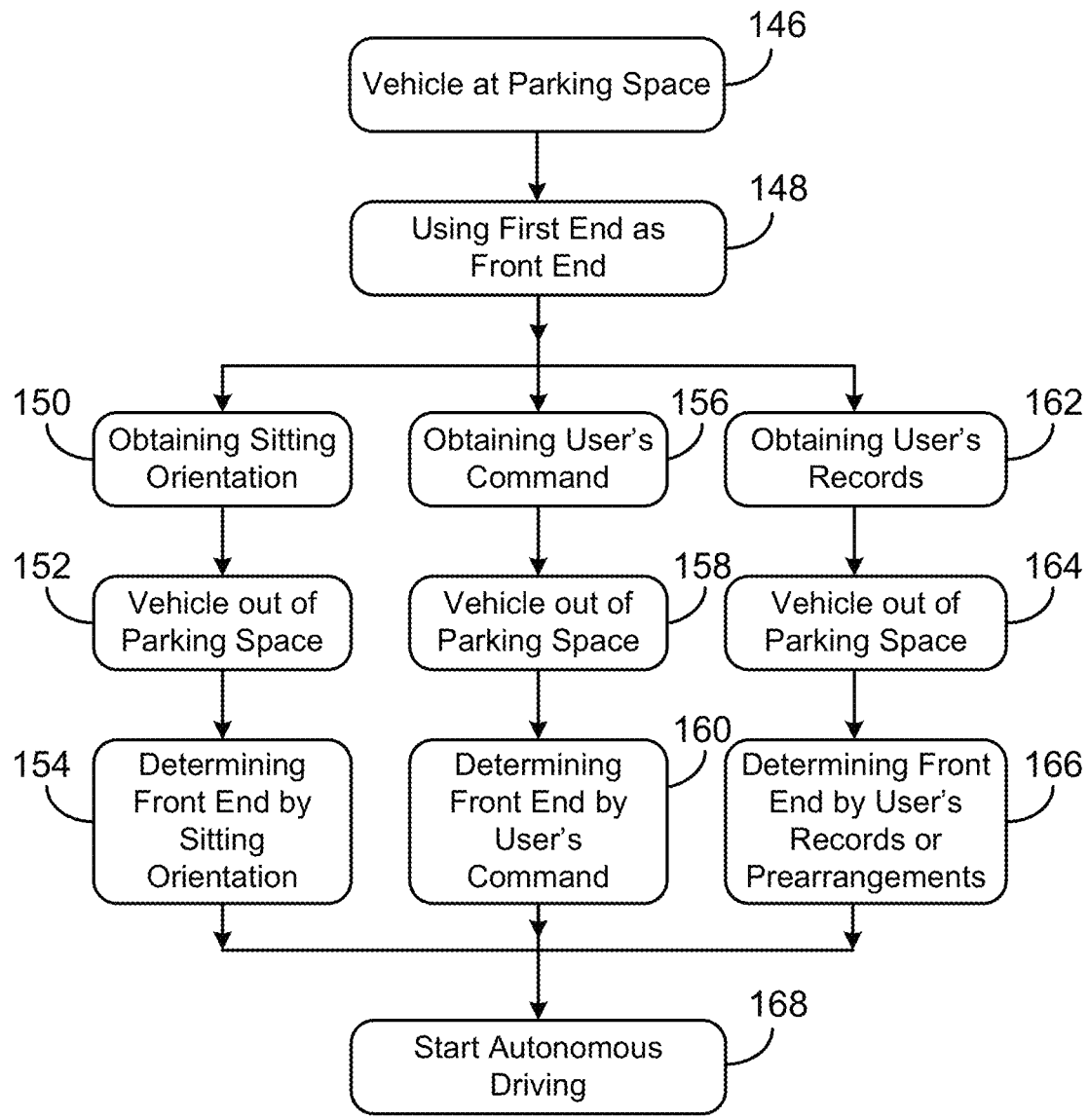
FIG. 8 is an exemplary flow diagram illustrating a process to decide a vehicle's front end at a parking lot in accordance with the present invention.

FIG. 8 shows an exemplary flow diagram which describes methods to determine a front end of a vehicle at a parking lot according to the present invention. At step 146, the bi-directional vehicle is parked at a parking space of the parking lot. The vehicle's control system detects that a user gets in the vehicle. Next, the user performs a check-in process, and the control system receives a destination and other information from the user.

Assume the vehicle has a first end and a second end. Either the first end or the second ends can be used as the front end of the vehicle. The parking space has certain restrictions. Assume when the vehicle is at the parking space, the first end faces a road, an aisle, or a driveway, while the second end face a blocking object (e.g., a curb or parking block). As such, the first end is used as the front end at step 148, when the vehicle is ready to drive out of the parking space. However, although the first end is selected as the front end when the vehicle is moving out of the parking space, the first end may not be suitable as the front end outside the parking space.

At step 150, the control system uses sensors to detect and obtain the sitting orientation of the user, which may be done after the user takes a seat or at a later time. Thereafter, the control system may ascertain whether the user faces the first end or the second end. At step 152, the vehicle drives out of the parking space. Assume the control system does not receive any command about front end selection from the user, and does not have other information with respect to front end selection (e.g., certain records). At step 154, the control system determines the front end by the sitting orientation of the user. If the user faces the first end, the first end continues to be the front end. If the user faces the second end, the vehicle uses the second end as the front end by, e.g., stopping temporarily, adjusting the front end setting, and reversing the driving direction. Then, the process proceeds with step 168. In some cases, after step 154 is done, the control system receives a command about front end selection from the user. In such cases, the command may overwrite decisions made at step 154.

At step 156, the control system monitors whether the user submits any instructions and obtains a command related to front end selection. Optionally, the control system may use records of the user to analyze and interpret the command. At step 158, the vehicle drives out of the parking space. At step 160, the control system determines the front end based on the command. If the command indicates the first end is the front end, the first end remains as the front end. If the command indicates the second end is the front end, the vehicle switches the front end and uses the second end as the front end. Then, the process proceeds with step 168.

At step 162, the control system obtains the user's records or prearrangements that are related to front end selection from Service Center. At step 164, the vehicle drives out of the parking space. At step 166, the control system determines the front end based on the records or prearrangements. If the records or prearrangements indicate the first end is the front end, the first end remains as the front end. If the records or prearrangements indicate the second end is the front end, the vehicle switches the front end and uses the second end as the front end. Then, the process proceeds with step 168. In some cases, after step 166 is done, the control system receives a command about front end selection from the user. In such cases, the command may overwrite decisions made at step 166 since the command made by the user on site prevails.

At step 168, a sign may be turned on to show the forward direction for the user. The exterior of the vehicle may be adjusted if there is a need, e.g., when the front end is switched from one side to the other side. The vehicle starts a journey and navigates to the destination.

Assume the vehicle can turn left or right when driving out of the parking space of the parking lot. Optionally, before the vehicle is outside the parking space, the control system may decide which end should be the front end based on the user's sitting orientation, command, records, or prearrangements. That is, at least part of the step 154, 160, or 166 may be done before or at step 152, 158, and 164, respectively. Accordingly, the control system may have determined to turn left or right before driving out of the parking space. In such cases, the control system may prearrange the orientation of the vehicle such that driving in the parking lot is easier and simpler. For example, if the second end is determined as the front end, the control system may make a turn to let the second end facing a select exit of the parking lot, the destination, or a planned driving direction when the vehicle is out of the parking space. That is, after deciding the second end is the front end outside the parking space, the control system may move the vehicle out of the parking space with the first end as the front end, make a turn to let the second end facing a predetermined direction, stop the vehicle, change the front end, change the exterior shape when needed, and then navigate the vehicle to the destination with the second end as the front end.

CONCLUSION, RAMIFICATIONS, AND SCOPE

Thus it can be seen that systems and methods are introduced to select a forward direction and front end properly, which may improve user experience of bi-directional autonomous vehicles.

The improved systems and methods have the following main features and advantages:

(1) A vehicle's forward direction and front end may be determined based on a user's voice and gesture instructions;
(2) A vehicle's forward direction and front end may be determined based on a user's past records or prearrangements;
(3) A vehicle's forward direction and front end may be determined based on a user's sitting orientation or seat selection;
(4) A vehicle's forward direction and front end may be determined based on destination info, parking lot conditions, and/or road conditions; and
(5) A vehicle's exterior shape may be adjustable according to front end selection.

Although the description above contains many specificities, these should not be construed as limiting the scope of the invention but as merely providing illustrations of some of the presently preferred embodiments. Numerous modifications will be obvious to those skilled in the art.

Ramifications:

In FIGS. 2-A to 2-D, vehicle 36 may also have a symmetric shape or a shape that is approximately symmetric. For instance, the control system may send signals to the actuators such that the vehicle's two ends may have the same shape, i.e., sheets 46 may be flat or bulged at both ends. In other words, four options may be provided to a user: The vehicle may have a bulged surface at the left side and flat surface at the right side, flat surface at the left side and bulged surface at the right side, or bulged or flat surface at both sides. In some embodiments, a bulged surface may represent a front end. Alternatively, a flat surface may also represent a front end. In some embodiments, an option may be arranged such that a user may choose the shape of a front end.

A control system of a bi-directional vehicle may also take an order to change front end during a journey. Cameras and microphones may be arranged to monitor a user inside a vehicle continuously. Once a user says "Switch front end" in the middle of a trip, for example, the command may be received by microphones and translated by a voice recognition system or a voice recognition algorithm. Then the message is sent to the control system, which in turn calculates a route segment using a route algorithm. The vehicle may take the route segment, stop at an appropriate place, and then drive with the opposite side as the front end. Thus, front and rear ends may be switched at any time when road conditions are suitable. The change may benefit users who don't like to move to another seat but want to face the opposite direction during a journey.

As aforementioned, after a check-in process is over, a vehicle's control system may ascertain a user's sitting orientation to decide which direction should be the forward direction and which side should be the front end. In some embodiments, the control system may detect that there are the same number of users sitting on each side in a face-to-face configuration. Then the system may not be able to use the sitting orientation to do it anymore. The dilemma may be overcome with a facial recognition method. It may be designed that after multiple users enter a vehicle, the users may be observed by a facial recognition method. The recognition method may recognize each user's identity or estimate the age of the users via facial features. Then the vehicle's control system may use age info to label a user, for instance, as child, adult, or senior citizen.

As used herein, the word "child" may mean a minor, for instance, a person below the age of sixteen. The word "adult" may mean a young or middle-aged adult. "Adult" may include a senior citizen when senior citizen is not mentioned. Certain rules may be made based on the age info. For instance, when a child and an adult sit face to face, the control system may decide a front end based on the adult's sitting orientation. When an adult and a senior citizen are face to face, the senior citizen's position prevails and may be used for determination of the front end. The rule also applies to child versus senior citizen scenario, where the senior citizen's position prevails, too. Thus, a decision may be made based on sitting orientation of a specific user. The decision, however, may be voided by a user's voice or gesture command. For instance, a user may submit voice and/or gesture instructions anytime to overwrite a decision made by the control system based on sitting orientation or other factors.

Further, a vehicle's control system may monitor multiple users' voice and gestures at the same time. Any input detected may be analyzed to find out whether it contains any user command by the control system or running a recognition algorithm. When a user gives a voice and/or gesture command, the control system may obey the order and perform a task accordingly. But when there are multiple users, a control system may receive contradictory orders from different users within a short time, such as two to five seconds. For instance, a user may utter "Go this way" while pointing to a direction. However, another user may utter "Go that way" and point to the opposite direction within, for instance, two to five seconds after the first user finishes speaking. When the control system receives the orders, it may not be able to figure out which one it should follow. Thus, certain rules may be designed. Like described above, the control system may estimate each user's age using data obtained from a facial recognition method. The users may be categorized, like aforementioned, as child, adult, and senior citizen. When voice orders are received from a child and an adult or senior citizen respectively, the adult's or senior citizen's order prevails. In addition, when contradictory voice orders are from multiple adults or senior citizens, the voice order that is received last in a time line prevails. Similarly, when multiple orders are all from children, the last one prevails.

The age of a user may also be estimated roughly using a voice recognition method or voice recognition algorithm. Everyone has his or her unique voice. Voice may be analyzed to identify a user or estimate a user's age roughly. In embodiments described herein, a user's voice may be ascertained to find out whether the user is a child. The method may be especially effective when a target user is a small child. It provides another way to categorize a user as child or adult when the facial recognition means is not available. Rules about selecting a user's order after receiving multiple orders may apply not only to autonomous vehicles, but also smart voice-controlled devices like smart speakers or intelligent speakers. Autonomous vehicles and certain smart devices may employ the same method, since they are all configured to implement a task based upon voice and/or gesture input from users.

After an autonomous vehicle or a smart device receives a voice command from a user, it doesn't act immediately. Instead, it may wait for a given time, such as two to five seconds. If no other user input is detected within the given time, an order receiving process is concluded and the order may be carried out. If another order is received within the given time, the vehicle or device may identify users involved using a facial and/or voice recognition method. The main goal is to recognize whether a user is a child. If it is detected that one order is issued by a child while the other by an adult, the adult's order may prevail and be implemented. If the orders are from two children or two adults, the second order may prevail. When there are more than two orders, the last order may prevail if the users are all children or all adults. When there are multiple orders coming from children and multiple orders from adults, the last adult order may prevail and be implemented. In addition, when a child's order is carried out, certain restrictions may apply. For instance, some preselected actions or tasks may become off limits. As used herein, the word "order" may indicate a request from a user to do a task which a vehicle or device is configured to implement.

In some embodiments, a name "Speaker" is assigned to a smart speaker, an intelligent voice recognition software that works via the smart speaker, or an intelligent voice system that works via the smart speaker. In descriptions below, the word "speaker" may represent the smart speaker, the voice recognition software, or the voice recognition system. Optionally, "Speaker" may also be designed as a wake word. When it is detected that a user utters "Speaker", the speaker is arranged to treat voice and/or gesture input of the user or other users, which follows the wake word within a given time, as an order or orders it has to process. Assume that the speaker detects the following voice messages. User A said "Speaker, turn on TV". Then within a given time interval, user B said "No, don't turn on". Then within the given time interval after user B completes the sentence, user A said "Yes, please turn on". After the speaker receives multiple orders, the orders may be analyzed by the speaker or an analyzing algorithm. If the orders can be executed respectively or simultaneously, the orders may be implemented respectively or simultaneously by the speaker or via the speaker. If some orders are against each other and cannot be accepted together within a short time, such as the scenario between users A and B described above, certain rules have to be followed. For example, when the speaker is collecting the voice input, the speaker may estimate the age of the users by executing an identification algorithm. If it is detected that user A is a child and user B is an adult, user B's order prevails and the speaker won't turn on the TV. If both are children or adults, the last order prevails. The speaker may send a signal to turn on the TV. The example applies to an autonomous vehicle where a control system may make decisions and implement a task by running certain algorithms.

As some bi-directional vehicles may also be controlled or operated by a driver, the above-described methods apply to not only autonomous bi-directional vehicles, but also bi-directional vehicles that are operated by a driver.

Lastly, when a vehicle is parked beside a curb waiting for users, it may display signs to show that it is bi-directional. The signs may include two arrows pointing to opposite directions and an optional word "Bi-Directional". The vehicle may have a symmetric shape or asymmetric shape with an adjustable appearance. The signs may be helpful for some users who like to ride on a bi-directional vehicle.

Therefore the scope of the invention should be determined by the appended claims and their legal equivalents, rather than by the examples given.

The invention claimed is:

1. A method performed for operating a bi-directional vehicle parked at a parking space, comprising:
   1) obtaining information about whether a user faces a first end or a second end of the vehicle after the user takes a seat in the vehicle;
   2) driving the vehicle out of the parking space using the first end as a front end;
   3) after the vehicle is out of the parking space, continuing using the first end as the front end if the user faces the first end after taking the seat, or using the second end as the front end if the user faces the second end after taking the seat, the front end facing a forward driving direction of the vehicle; and
   4) driving the vehicle to a destination.

2. The method according to claim 1, further including obtaining a command from the user, and if the second end is selected as the front end based on where the user faces and the command indicates the first end is the front end, using the first end as the front end after the vehicle comes out of the parking space.

3. The method according to claim 2 wherein the command is a voice command or a gesture command of the user.

4. The method according to claim 1, further including obtaining a command from the user, and if the first end is selected as the front end based on where the user faces and the command indicates the second end is the front end, using the second end as the front end after the vehicle comes out of the parking space.

5. The method according to claim 1, further including changing an exterior shape of the vehicle after the vehicle's front end is changed from the first end to the second end or from the second end to the first end.

6. The method according to claim 1, further including presenting a sign or indicator that shows the forward driving direction after the front end is selected.

7. The method according to claim 1 wherein the first end faces a road, an aisle, or a driveway when the vehicle is parked at the parking space.

8. A method performed for operating a bi-directional vehicle parked at a parking space, comprising:
   1) obtaining a command from a user in the vehicle;
   2) driving the vehicle out of the parking space using a first end as a front end;
   3) after the vehicle is out of the parking space, continuing using the first end as the front end if the command indicates the first end is the front end, or using a second end of the vehicle as the front end if the command indicates the second end is the front end, the front end facing a forward driving direction of the vehicle; and
   4) driving the vehicle to a destination.

9. The method according to claim 8 wherein the command is a voice command or a gesture command of the user.

10. The method according to claim 8, further including changing an exterior shape of the vehicle after the vehicle's front end is changed from the first end to the second end or from the second end to the first end.

11. The method according to claim 8, further including presenting a sign or indicator that shows the forward driving direction after the front end is selected.

12. The method according to claim 8 wherein the first end faces a road, an aisle, or a driveway when the vehicle is parked at the parking space.

13. The method according to claim 8, further including using records of the user to analyze the command.

14. The method according to claim 13, further including obtaining the records of the user from a service facility.

15. A method performed for operating a bi-directional vehicle parked at a parking space, comprising:
   1) obtaining records or a prearrangement of a user;
   2) driving the vehicle out of the parking space using a first end as a front end after the user gets in the vehicle;
   3) after the vehicle is out of the parking space, continuing using the first end as the front end if the records or prearrangement indicates the first end is the front end, or using a second end of the vehicle as the front end if the records or prearrangement indicates the second end is the front end, the front end facing a forward driving direction of the vehicle; and
   4) driving the vehicle to a destination.

16. The method according to claim 15, further including obtaining a command from the user, and if the second end is selected as the front end based on the records or prearrangement and the command indicates the first end is the front end, using the first end as the front end after the vehicle comes out of the parking space.

17. The method according to claim 15, further including obtaining a command from the user, and if the first end is selected as the front end based on the records or prearrangement and the command indicates the second end is the front end, using the second end as the front end after the vehicle comes out of the parking space.

18. The method according to claim 15, further including changing an exterior shape of the vehicle after the vehicle's front end is changed from the first end to the second end or from the second end to the first end.

19. The method according to claim 15, further including presenting a sign or indicator that shows the forward driving direction after the front end is selected.

20. The method according to claim 15 wherein the first end faces a road, an aisle, or a driveway when the vehicle is parked at the parking space.

* * * * *